US011978620B2

(12) United States Patent
Bezel et al.

(10) Patent No.: US 11,978,620 B2
(45) Date of Patent: May 7, 2024

(54) SWIRLER FOR LASER-SUSTAINED PLASMA LIGHT SOURCE WITH REVERSE VORTEX FLOW

(71) Applicant: KLA Corporation, Milpitas, CA (US)

(72) Inventors: Ilya Bezel, Mountain View, CA (US); Leonid Borisovich Zvedenuk, Moscow (RU); Andrey Evgenievich Stepanov, Moscow (RU); Amir Torkaman, San Carlos, CA (US)

(73) Assignee: KLA Corporation, Milpitas, CA (US)

( * ) Notice: Subject to any disclaimer, the term of this patent is extended or adjusted under 35 U.S.C. 154(b) by 21 days.

(21) Appl. No.: 17/880,455

(22) Filed: Aug. 3, 2022

(65) Prior Publication Data

US 2023/0053035 A1 Feb. 16, 2023

Related U.S. Application Data

(60) Provisional application No. 63/232,215, filed on Aug. 12, 2021.

(51) Int. Cl.

| | |
|---|---|
| ***H01J 61/28*** | (2006.01) |
| ***H01J 61/02*** | (2006.01) |
| ***H01J 61/52*** | (2006.01) |
| ***H01J 65/04*** | (2006.01) |

(52) U.S. Cl.

CPC .......... *H01J 65/042* (2013.01); *H01J 61/025* (2013.01); *H01J 61/28* (2013.01); *H01J 61/52* (2013.01)

(58) Field of Classification Search

None

See application file for complete search history.

(56) References Cited

U.S. PATENT DOCUMENTS

| | | |
|---|---|---|
| 4,179,599 A | 12/1979 | Conrad |
| 5,608,526 A | 3/1997 | Piwonka-Corle et al. |
| 5,999,310 A | 12/1999 | Shafer et al. |
| 6,297,880 B1 | 10/2001 | Rosencwaig et al. |
| 7,345,825 B2 | 3/2008 | Chuang et al. |

(Continued)

FOREIGN PATENT DOCUMENTS

| | | |
|---|---|---|
| EP | 0870072 B1 | 9/2004 |

OTHER PUBLICATIONS

Search Report and Written Opinion dated Dec. 2, 2022 in International Application No. PCT/US2022/039893, 9 pages.

U.S. Appl. No. 17/696,653, filed Mar. 16, 2022, Ilya Bezel.

*Primary Examiner* — Jason M Crawford

(74) *Attorney, Agent, or Firm* — Suiter Swantz IP

(57) ABSTRACT

A plasma lamp for use in a laser-sustained plasma (LSP) light source is disclosed. The plasma lamp includes a gas containment structure for containing a gas, a gas seal positioned at a base of the gas containment structure, a gas inlet, and a gas outlet. The plasma lamp includes a gas swirler including a set of nozzles configured to generate a vortex gas flow and a swirler shaft including an inlet channel for delivering the gas from the gas inlet to the nozzles and an outlet channel for delivering the gas from the gas containment structure to the gas outlet. The plasma lamp includes a distributor including one or more plenums to distribute the gas from the gas inlet into the swirler. The plasma lamp may also include a deflector fluidically coupled to the swirler shaft and extending above the set of nozzles and configured to direct gas flow around the swirler.

30 Claims, 17 Drawing Sheets

(56) References Cited

U.S. PATENT DOCUMENTS

| | | | |
|---|---|---|---|
| 7,435,982 B2 | 10/2008 | Smith | |
| 7,525,649 B1 | 4/2009 | Leong et al. | |
| 7,786,455 B2 | 8/2010 | Smith | |
| 7,957,066 B2 | 6/2011 | Armstrong et al. | |
| 7,989,786 B2 | 8/2011 | Smith et al. | |
| 8,182,127 B2 | 5/2012 | Yasuda et al. | |
| 8,309,943 B2 | 11/2012 | Smith et al. | |
| 8,525,138 B2 | 9/2013 | Smith et al. | |
| 8,921,814 B2 | 12/2014 | Pellemans et al. | |
| 9,185,788 B2 | 11/2015 | Bezel et al. | |
| 9,228,943 B2 | 1/2016 | Wang et al. | |
| 9,263,238 B2 | 2/2016 | Wilson et al. | |
| 9,318,311 B2 | 4/2016 | Chimmalgi et al. | |
| 9,390,902 B2 | 7/2016 | Bezel et al. | |
| 9,721,761 B2 | 8/2017 | Wilson et al. | |
| 9,775,226 B1 | 9/2017 | Bezel et al. | |
| 10,350,707 B2 * | 7/2019 | Pan | B23K 26/1464 |
| 10,690,589 B2 | 6/2020 | Bezel et al. | |
| 11,776,804 B2 | 10/2023 | Bezel et al. | |
| 2014/0159572 A1 | 6/2014 | Risby et al. | |
| 2014/0346151 A1 | 11/2014 | Crowe | |
| 2016/0163516 A1 | 6/2016 | Wilson et al. | |
| 2020/0063040 A1 | 2/2020 | Soane et al. | |
| 2021/0282256 A1 * | 9/2021 | Abramenko | H05H 1/24 |
| 2021/0321508 A1 | 10/2021 | Bezel et al. | |

* cited by examiner

101

SWIRLER FOR LASER-SUSTAINED PLASMA LIGHT SOURCE WITH REVERSE VORTEX FLOW

CROSS-REFERENCE TO RELATED APPLICATION

The present application claims the benefit under 35 U.S.C. § 119(e) of U.S. Provisional Application Ser. No. 63/232,215, filed Aug. 12, 2021, which is incorporated herein by reference in the entirety.

TECHNICAL FIELD

The present invention generally relates to a laser sustained plasma (LSP) broadband light source and, in particular, an LSP source capable of reverse vortex flow.

BACKGROUND

The need for improved light sources used for inspection of ever-shrinking semiconductor devices continues to grow. One such light source includes a laser sustained plasma (LSP) broadband light source. LSP broadband light sources include LSP lamps, which are capable of producing high-power broadband light.

One of the most significant limitations for LSP lamp operation is the thermal regime of the glass itself and other construction elements (e.g., electrodes, seals, nozzle orifice, etc.) placed in the vicinity of the plasma. Locating high-power LSP in the proximity of any construction elements may create a high-radiative thermal load on these construction elements and cause overheating and melting of the construction elements. For flow-through lamp designs, removing the convection control elements from the plasma to safe distance results in their reduced efficiency.

Cooling of the glass lamp envelope is another severe problem in high-power lamp operation. These heat sources include hot gas circulating within the plasma lamp and large amounts of plasma VUV radiation that is absorbed on the inside surface of the glass of the lamp. Glass cooling occurs on the outside of the cell, resulting in large thermal gradients across the thickness of the glass. In some cases, the thermal gradients can exceed 100° C./mm. This creates an unfavorable thermal regime where the inside surface of the glass is much hotter than the outside surface, thereby reducing the efficiency of cooling. Uneven temperature distribution also creates a likelihood of glass damage.

As such, it would be advantageous to provide a system and method to remedy the shortcomings of the previous approaches identified above.

SUMMARY

A plasma lamp is disclosed. In one embodiment, the plasma lamp includes a gas containment structure for containing a gas, wherein the gas containment structure comprises a body, a neck, and a shaft. In another embodiment, the plasma lamp includes a gas seal positioned at a base of the gas containment structure; a gas inlet; a gas outlet; and a gas swirler. In another embodiment, the gas swirler includes a plurality of nozzles positioned in or below the neck of the gas containment structure and arranged to generate a vortex gas flow within the gas containment structure; and a swirler shaft including an inlet channel for delivering the gas from the gas inlet to the plurality of nozzles and an outlet channel for delivering the gas from the gas containment structure to the gas outlet. In another embodiment, the plasma lamp includes a distributor, wherein the distributor includes one or more plenums configured to distribute the gas from the gas inlet into the swirler. In another embodiment, the plasma lamp includes a deflector fluidically coupled to the swirler shaft and extending above the plurality of nozzles.

In additional embodiments, the plasma lamp is integrated within a laser-sustained plasma (LSP) source. In additional embodiments, the LSP source including the plasma lamp is integrated within a characterization system, such as an inspection system or metrology system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION OF THE INVENTION

Figure 1:
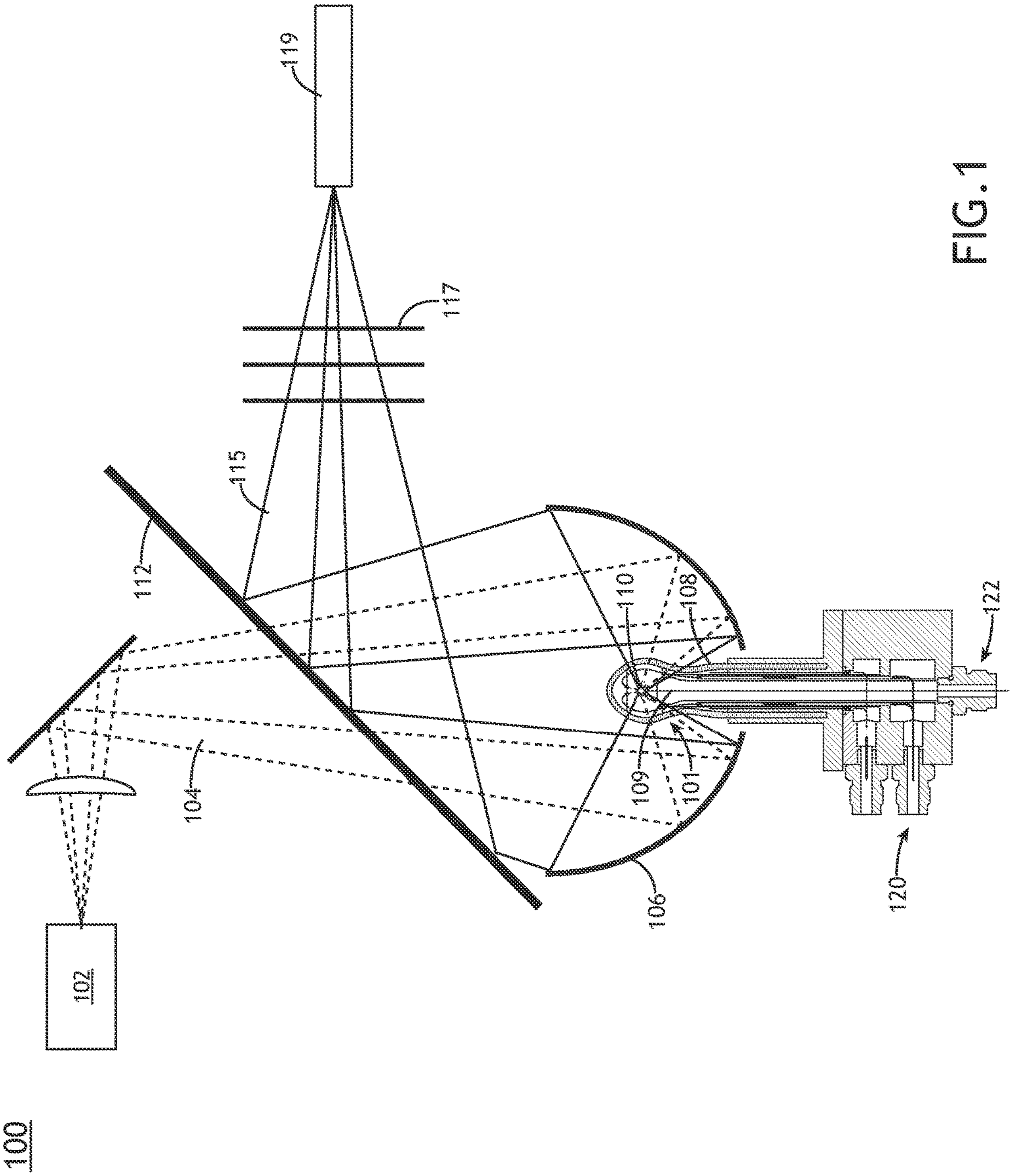
FIG. 1 is a schematic illustration of an LSP broadband light source with a reverse-flow vortex-generating gas cell, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to improvements in the operation of reverse-flow vortex plasma cell designs for use in laser-sustained plasma light sources. One of the challenges with reverse-flow vortex lamp operation is stability of the gas flow through the plasma cell. As stable flow patterns are established, the velocity of the jets emerging from swirler channels through swirler nozzles exceeds the Mach number of about 0.3 and is accompanied with a high degree of turbulence. This regime requires a large total pressure loss of about 10% relative to the lamp operational pressure of about 200 bar. In addition, a large amount of gas pumped through the lamp results in additional large pressure differentials in the gas supply lines. These factors lead to a large power of about tens of kilowatts required to provide recirculation of this gas. Lower flow velocities and lower flow rates, while consuming less power, result in unstable flow patterns in the lamp and, consequently, in unstable LSP operation.

The LSP light source of the present disclosure implements reverse vortex flow to organize gas flow through the LSP region of the LSP light source. Embodiments of the present disclosure are directed to a gas swirler including a shaft including an inlet channel for delivering gas from the gas inlet to a set of nozzles and an outlet channel for delivering gas from the gas containment structure to a gas outlet. The gas nozzles are arranged to generate gas jets in a spiral pattern that impinge on an inner surface of the body of the gas containment structure, which serve to efficiently cool the gas containment structure.

The gas swirler of the present disclosure provides for swirling gas flow that extends beyond the lamp equator and reverses its axial direction and forms high velocity (e.g., about 10 m/s) flow of high pressure (e.g., about 100-200 bar) gas through the plasma region. This regime of plasma operation provides significant advantage for plasma brightness in high-power (e.g., greater than about 5 kW) operation regime as compared to LSP operation in a stagnant volume of gas with the gas velocities driven by natural convection. The swirling gas flow of the present disclosure results in improved stability of the flow compared to straight flow injection patterns.

Fast swirling flow of the present disclosure provides intense uniform cooling of lamp components such as main body, swirler, and deflector, etc. Cooling of the lamp body occurs at the surfaces exposed to plasma radiative heating, thus eliminating high thermal gradients through the glass that result from traditional cooling on the outside of the lamp. The high temperature plasma plume is directed away from the lamp body through the central exhaust channel of a swirler shaft, thereby eliminating uneven heating in the lamp, which occurs at locations where hot exhaust gas contacts the lamp electrodes and glass. Swirler construction allows for some cold gas to be entrained directly into the exhaust center channel providing additional cooling of the swirler, deflector and other lamp components eliminating the need for additional cooling of these components.

Reverse vortex flow in lamps allows the inlet/outlet plumbing to be located on one side of the lamp significantly simplifying installation and lamp replacement design and procedures.

Additional embodiments of the present disclosure are directed to a distributor configured to direct gas from one or more gas inlets into the swirler. The gas distributor provides uniform feed to the swirler and to auxiliary flow channels resulting in better stability with lower pressure drop. Additional embodiments of the present disclosure are directed to a deflector positioned at the top of the swirler and configured to direct gas above the swirler. The deflector allows for a relatively low mass flow rate and low velocity operation with better efficiency and stability compared to simpler designs. This substantially reduces total pressure loss required for operation of high-velocity versions of simpler designs.

A flow-through plasma cell design is described in U.S. patent application Ser. No. 17/223,942, filed on Apr. 6, 2021, and U.S. patent application Ser. No. 17/696,653, filed on Mar. 16, 2022, which are incorporated herein by reference in the entirety.

FIG. 1 is a schematic illustration of an LSP light source 100 with reverse-vortex flow, in accordance with one or more embodiments of the present disclosure. The LSP source 100 includes a reverse-flow vortex cell 101. The LSP source 100 includes a pump source 102 configured to generate an optical pump 104 for sustaining a plasma 110 within the reverse-flow vortex cell 101. For example, the pump source 102 may emit a beam of laser illumination suitable for pumping the plasma 110. In embodiments, the light collector element 106 is configured to direct a portion of the optical pump 104 to a gas contained in a gas containment structure 108 of the vortex-producing cell 101 to ignite and/or sustain the plasma 110. The pump source 102 may include any pump source known in the art suitable for igniting and/or sustaining plasma. For example, the pump source 102 may include one or more lasers (i.e., one or more pump lasers). The pump beam may include radiation of any wavelength or wavelength range known in the art including, but not limited to, visible, IR radiation, NIR radiation, and/or UV radiation. The light collector element 106 is configured to collect a portion of broadband light 115 emitted from the plasma 110.

The broadband light 115 emitted from the plasma 110 may be collected via one or more additional optics (e.g., a cold mirror 112) for use in one or more downstream applications (e.g., inspection, metrology, or lithography). The LSP light source 100 may include any number of additional optical elements such as, but not limited to, a filter 117 or a homogenizer 119 for conditioning the broadband light 115 prior to the one or more downstream applications. The gas containment structure 108 may include a plasma cell, a plasma bulb (or lamp), or a plasma chamber.

The reverse flow vortex-cell 101 may include a gas swirler 109. As discussed further herein, the gas swirler 109 may include a swirler shaft 214 including an inlet channel for delivering gas from a gas inlet 120 to a set of nozzles and an outlet channel for delivering gas from the gas containment structure to the gas outlet 122.

Figure 2:
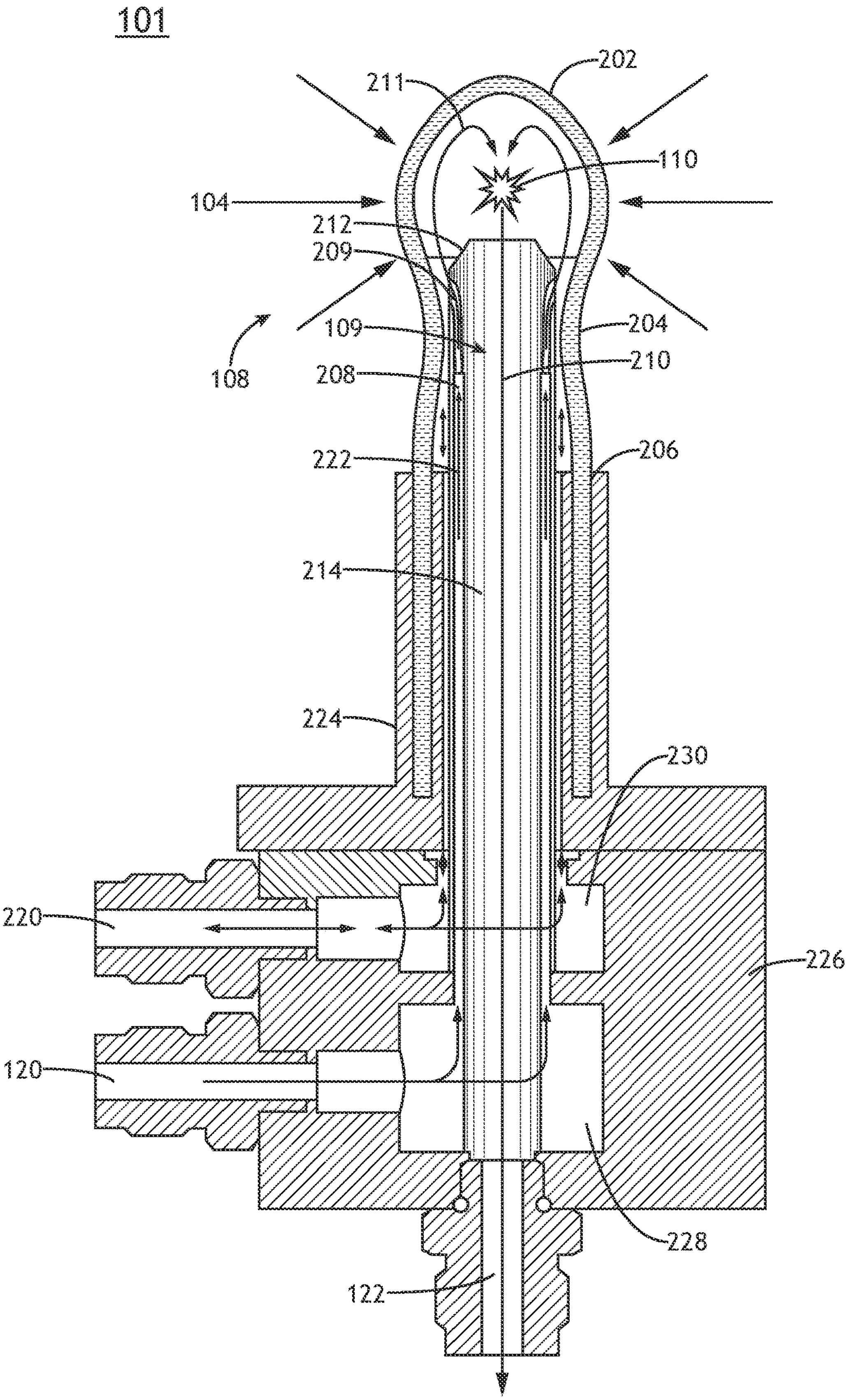
FIG. 2 is a schematic illustration of a reverse-flow vortex-generating gas cell for use in the LSP broadband light source, in accordance with one or more embodiments of the present disclosure.

FIG. 2 illustrates a simplified schematic view of the reverse-flow vortex cell 101, in accordance with one or more embodiments of the present disclosure. In embodiments, the gas containment structure 108 of the reverse-flow vortex cell 101 includes a body 202, a neck 204, and a shaft 206.

In embodiments, the gas swirler 109 includes swirler shaft 214. The swirler shaft 214 may include one or more inlet channels 208 for delivering gas from the gas inlet 120 to a set of nozzles 209. In embodiments, the swirler shaft 214 includes an outlet channel 210 for delivering gas from the gas containment structure 108 to the gas outlet 122. For example, the one or more inlet channels 208 may include an annular inlet channel arranged about the periphery of the swirler shaft 214 and configured to flow gas to the set of nozzles 209 for delivering gas to the plasma 110 within the body 202. The outlet channel 210 may include a center channel for flowing gas from the body 202 to the outlet 122. In this embodiment, the annular inlet channel may circumferentially encompass the center channel. In additional embodiments, the annular inlet channel may be equipped with one or more reinforcement structures configured to reinforce thin shaft walls of the annular inlet channel against the pressure differential between the inlet and outlet, which, in some embodiments can reach tens of bar. In embodiments, the swirler shaft 214 comprises a long shaft extending through the shaft 206 of the gas containment structure 108. In embodiments, the swirler shaft 214 may be positioned such that the nozzles 209 atop the swirler shaft 214 are positioned in or below the neck 204 of the gas containment structure 108.

In embodiments, the reverse-flow vortex cell 101 includes one or more auxiliary gas inlets and/or outlets 220. The one or more auxiliary inlets/outlets 220 may provide the additional flow into or from the volume between swirler 109 and body 202 in order to maintain flow stability by eliminating unnecessary gas recirculation.

In embodiments, the reverse-flow vortex cell 101 includes a distributor 226. The distributor 226 is configured to provide even distribution of gas to swirler 109. In some embodiments, as discussed further herein, the distributor also provides even distribution of gas to auxiliary flow paths (e.g., via auxiliary inlets/outlets). For example, the gas distributor 226 provides uniform feed to the swirler 109 and to auxiliary flow channels resulting in better stability with lower pressure drop. In embodiments, the distributor 226 includes one or more plenums configured to distribute gas from the gas inlet 120 into the swirler 109. For example, the distributor 226 may include one or more inlet plenums 228 or one or more auxiliary plenums 230. In embodiments, the distributor 226 directs the exhaust gas from the gas containment structure 108 to the outlet 210.

In embodiments, the gas swirler 109 includes a deflector 212. The deflector 212 may be positioned atop the swirler shaft 214. The deflector 212 may extend above the set of nozzles 209 and is configured to direct gas around the gas swirler 109. The deflector 212 allows for a relatively low mass flow rate and low velocity operation with better efficiency and stability compared to simpler designs, thereby substantially reducing total pressure loss required for operation of high-velocity versions of simpler designs.

Figure 3A:
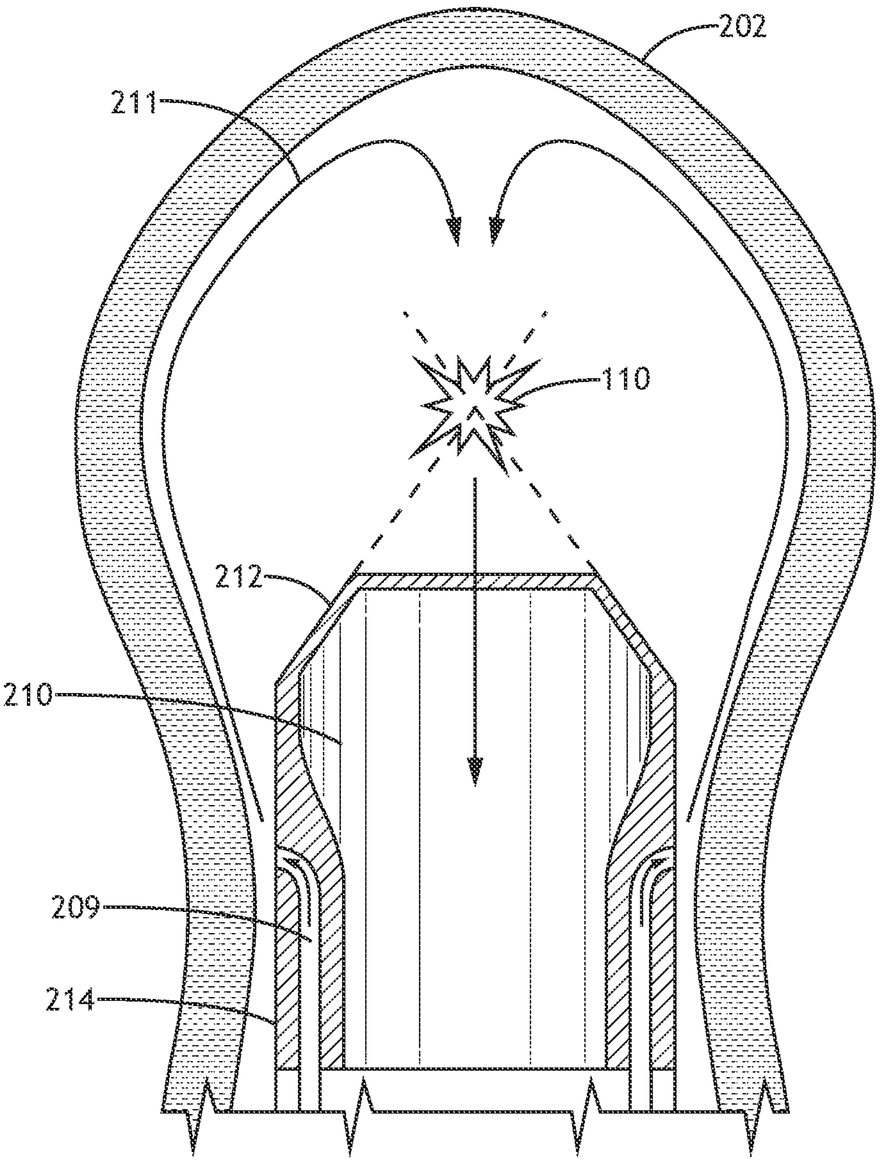
FIGS. 3A-3B are schematic illustrations of reverse-flow vortex-generating gas cell including a converging deflector, in accordance with one or more embodiments of the present disclosure.
Figure 3B:
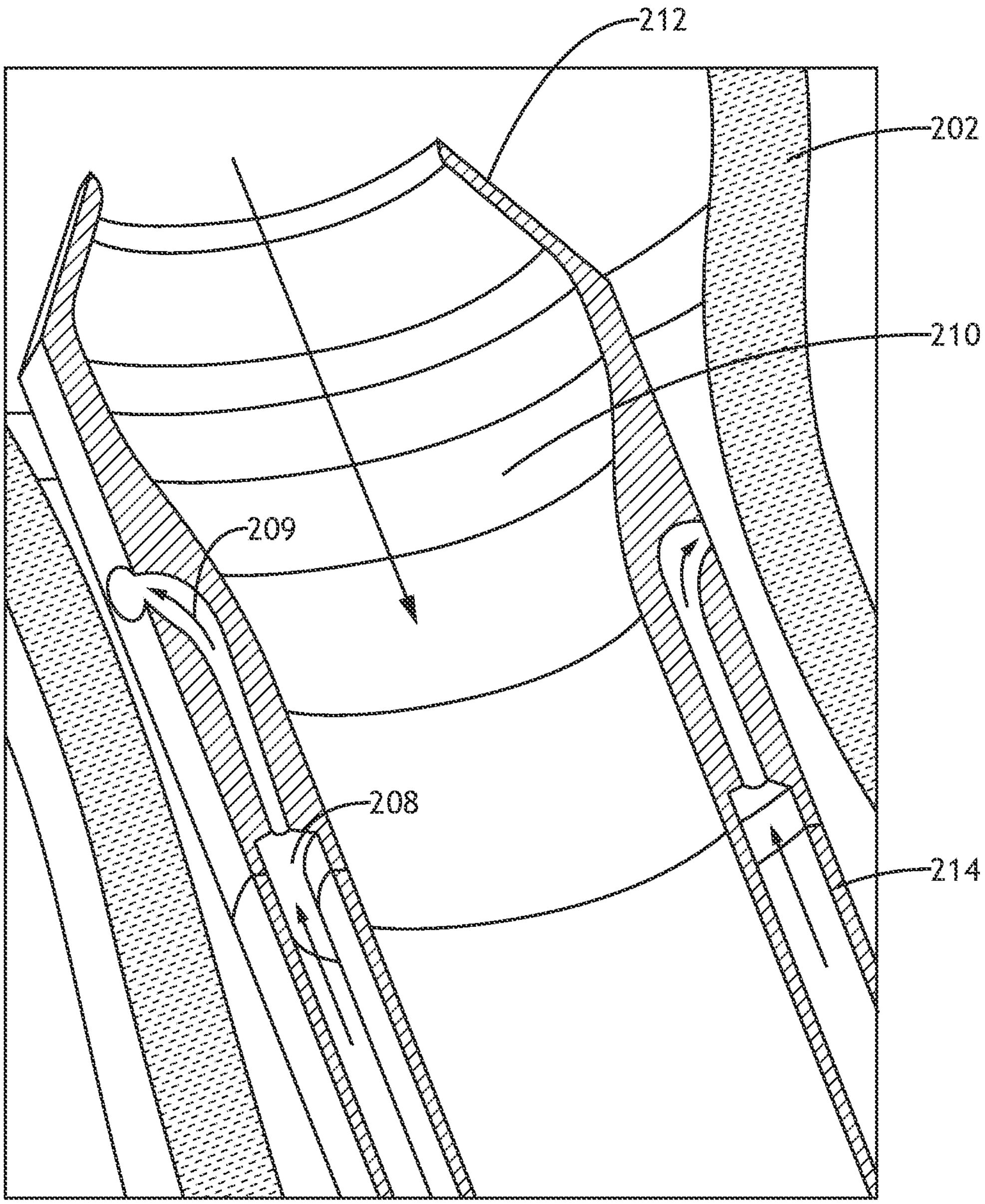

As shown in FIGS. 3A-3B, in embodiments, the deflector 212 may comprise a converging deflector. For example, the deflector 212 may include a converging nozzle (e.g., conical section). In this embodiment, the gas nozzles 209 emerge at the sides of the gas swirler 109 so that gas jets exit the side wall of the gas swirler 109, impinge on the wall of the body 202 of the gas-containment structure 108, and then move upward to the top of the body 202 and reverses direction toward the plasma 110. In embodiments, the converging shape (e.g., conical section) of the deflector 212 may be pointed toward the plasma 110, which reduces radiative heat load on the gas swirler 109 from radiation emitted by the plasma 110 due to the reduced area of the defector shape.

Figure 4A:
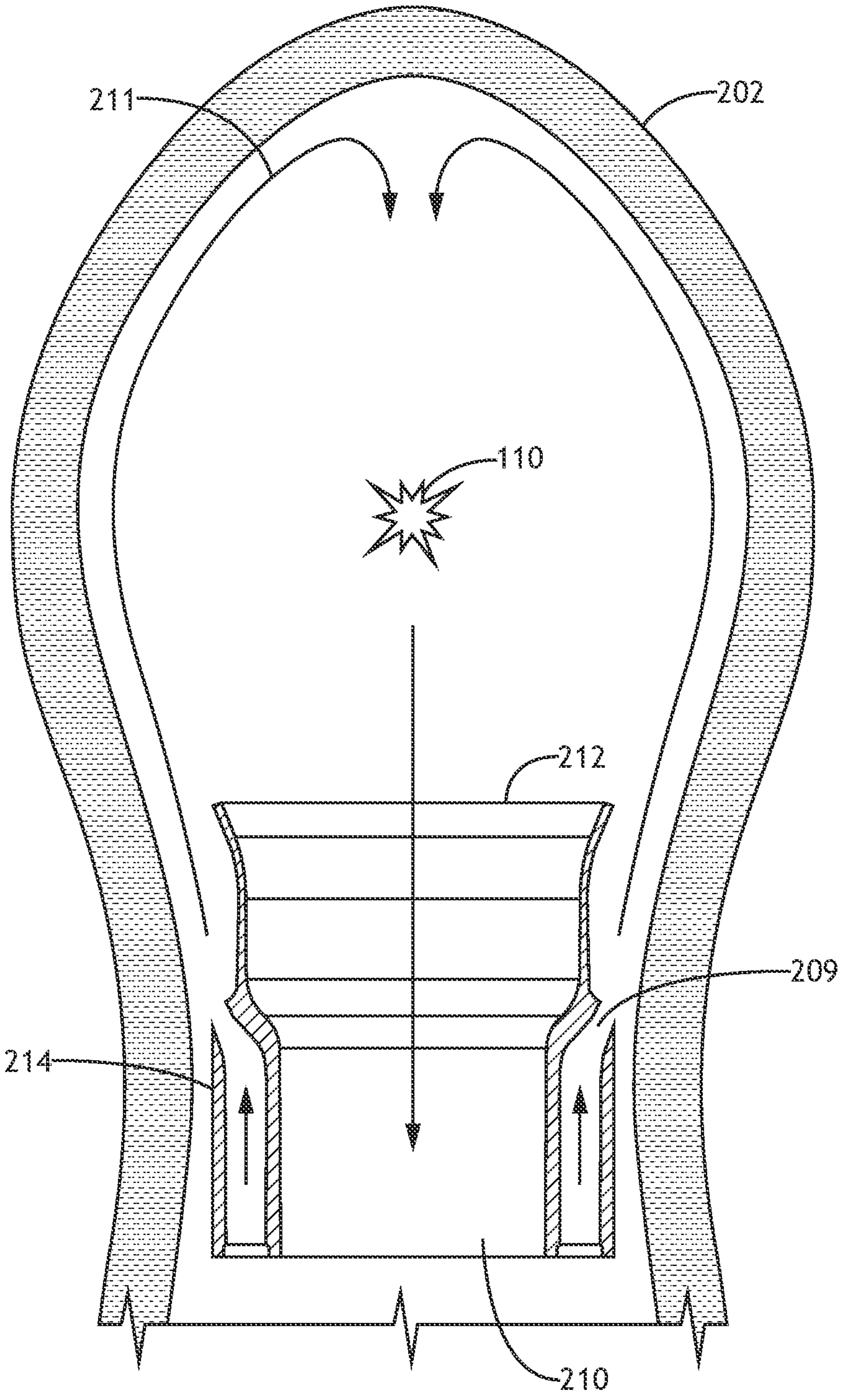
FIGS. 4A-4B are schematic illustrations of reverse-flow vortex-generating gas cell including a diverging deflector, in accordance with one or more embodiments of the present disclosure.
Figure 4B:
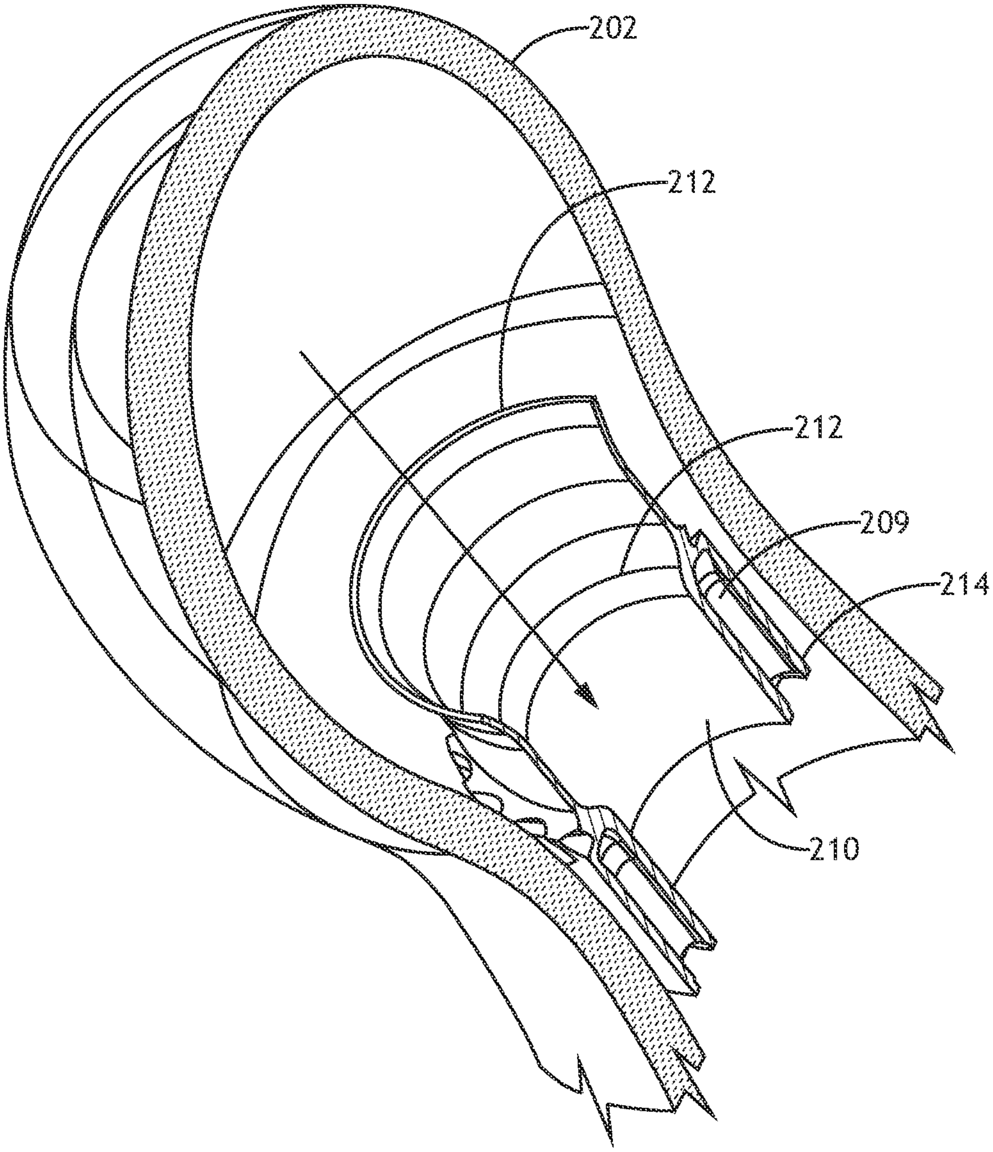

As shown in FIGS. 4A-4B, in embodiments, the deflector 212 may comprise a diverging deflector. For example, the deflector 212 may include a diverging nozzle. In this embodiment, the gas nozzles 209 again emerge at the sides of the gas swirler 109 so that gas jets exit the side wall of the gas swirler 109, impinge on the wall of the body 202 of the gas-containment structure 108, and then move upward to the top of the body 202 and reverses direction toward the plasma 110. In embodiments, the diverging shape of the deflector 212 may serve to direct swirling gas from the gas nozzles 209 to the body 202 of the gas containment structure 108.

It is noted that the scope of the present disclosure is not limited to a gas cell 101 including a deflector 212. Rather, in embodiments, the reverse-flow vortex cell 101 of the present disclosure is deflector-less (i.e., operates without a deflector).

Figure 5A:
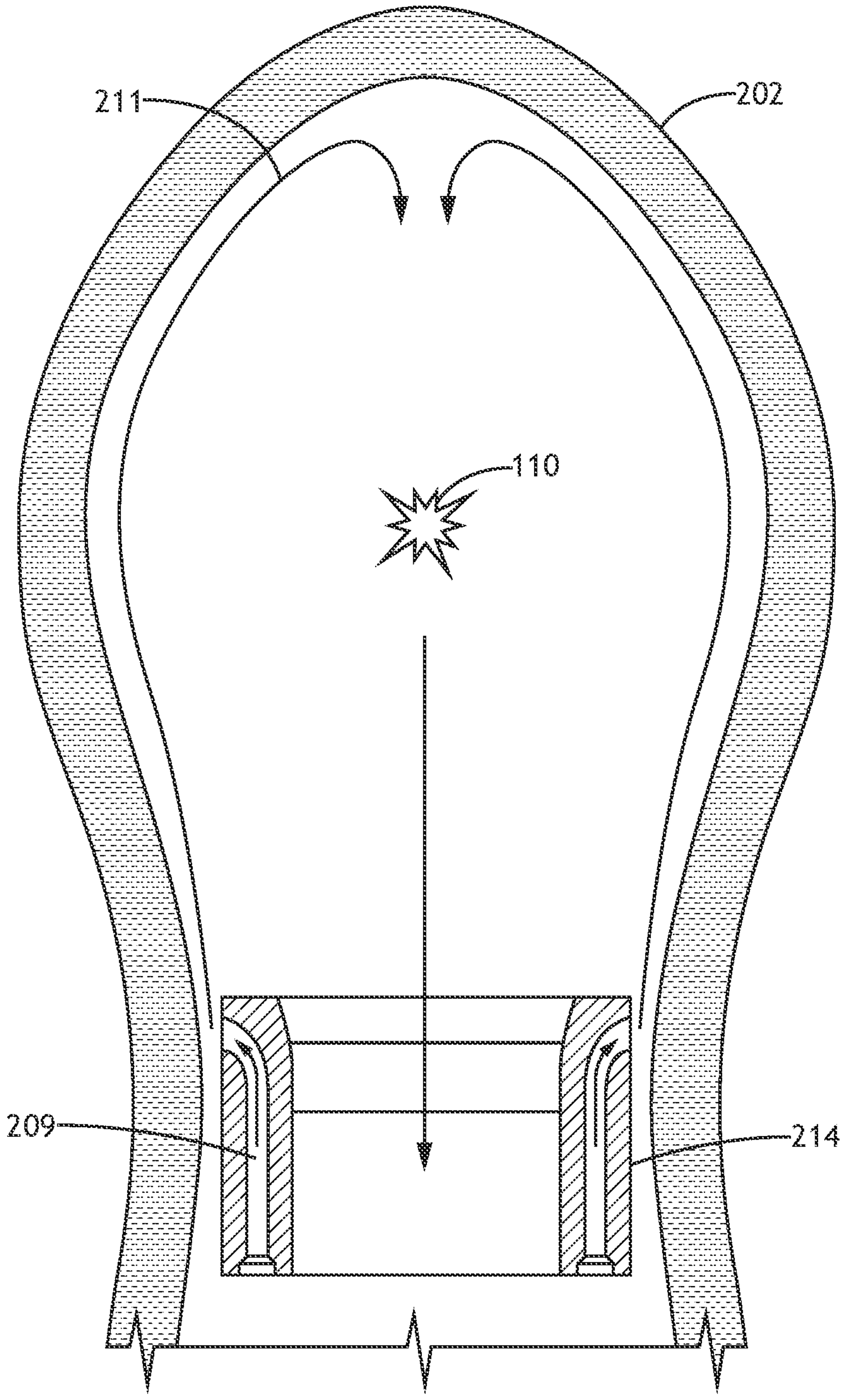
FIGS. 5A-5C are schematic illustrations of a swirler of a reverse-flow vortex-generating gas cell without a deflector, in accordance with one or more embodiments of the present disclosure.
Figure 5B:
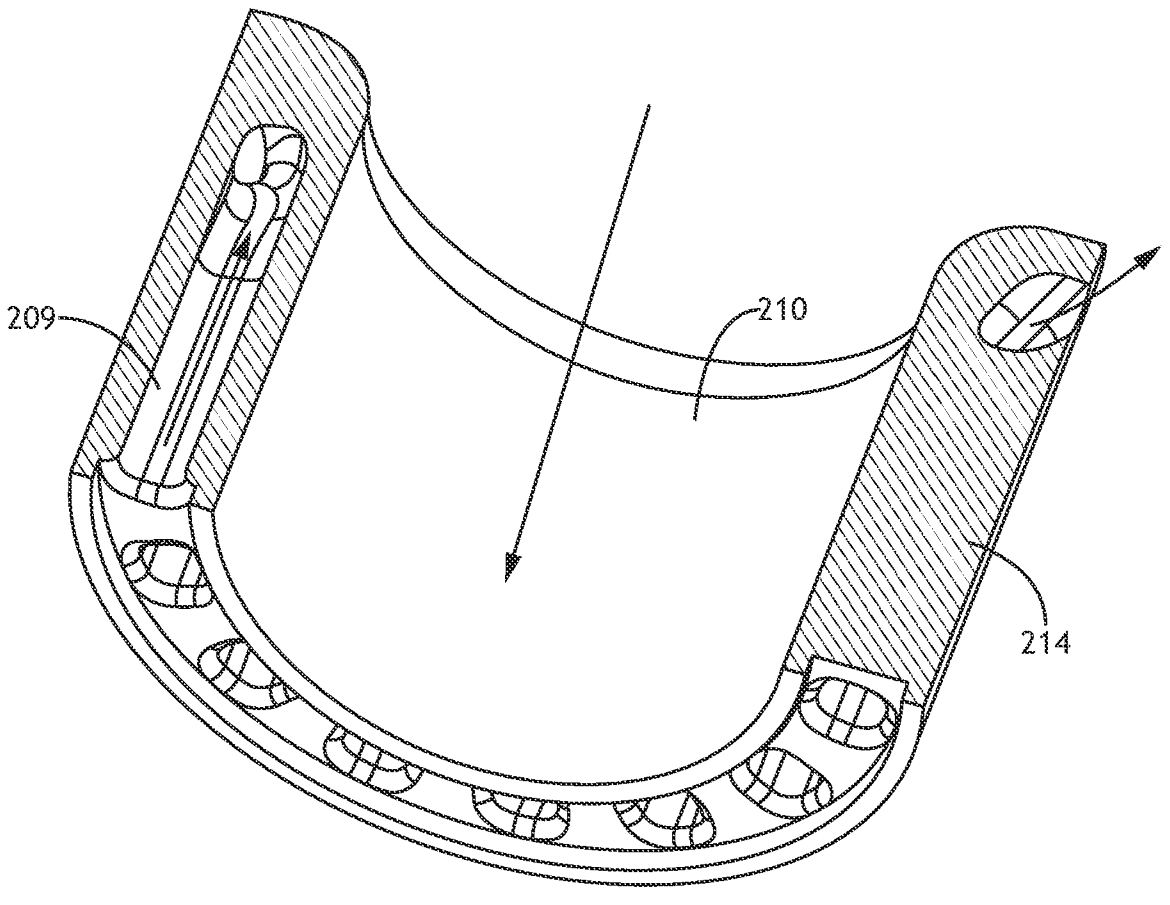
Figure 5C:
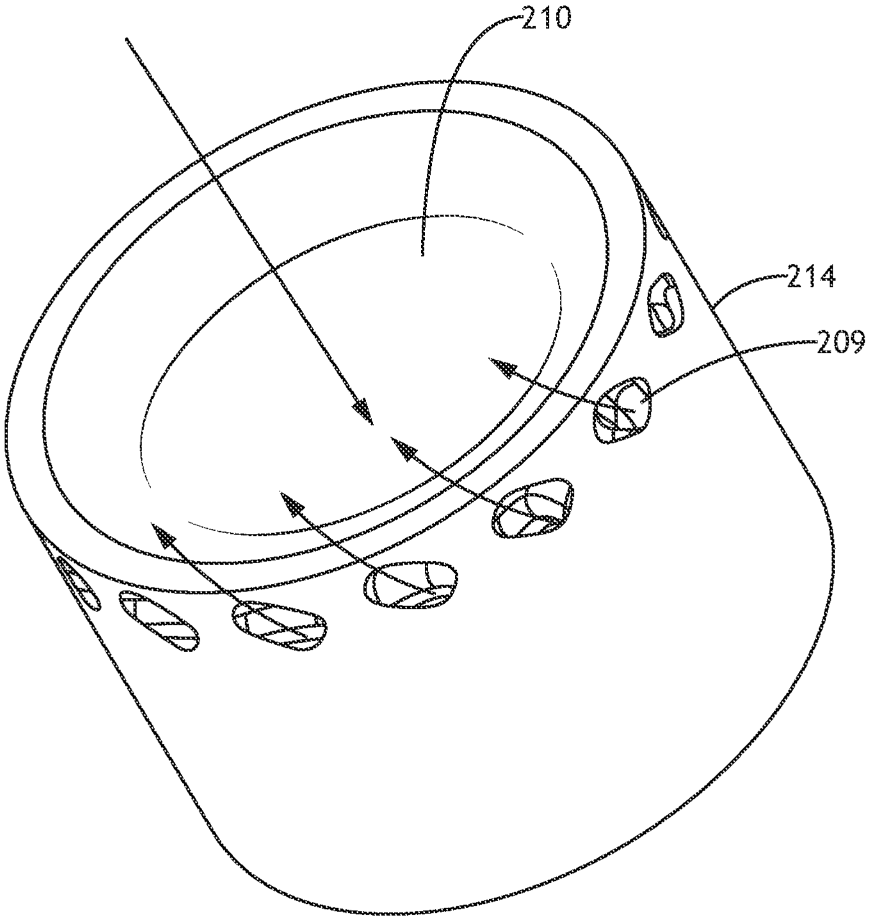
Figure 6:
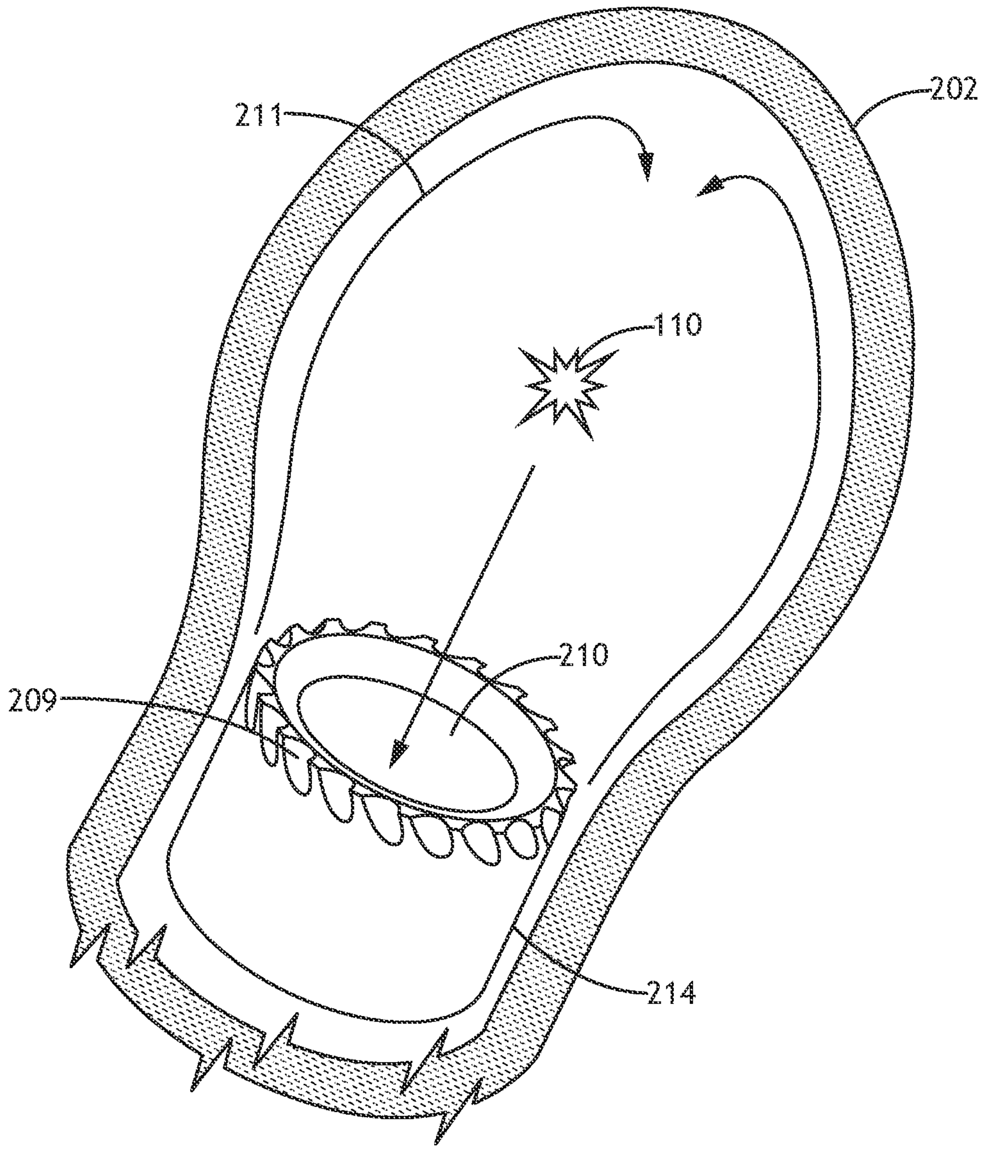
FIG. 6 is a schematic illustration of a swirler of a reverse-flow vortex-generating gas cell without a deflector, in accordance with one or more embodiments of the present disclosure.

FIGS. 5A-5C illustrate a defector-less swirler 109 arrangement, in accordance with one or more embodiments of the present disclosure. In this embodiment, the gas nozzles 209 are located on a side wall at the top portion of the swirler shaft 214. FIG. 6 illustrates a defector-less swirler 109 arrangement, in accordance with one or more embodiments of the present disclosure. In this embodiment, the gas nozzles 209 are located on an outer rim at the top portion of the swirler shaft 214.

During operation, in embodiments, swirler 109 and the set of nozzles 209 are configured to generate a set of fast-moving gas jets 211 in a spiral pattern impinging on an inner surface of the body 202 of the gas containment structure 108, where the axial flow reverses direction and leaves the body 202 through the outlet channel 210 (e.g., central outlet channel) of the swirler 109. For example, the nozzles 209 direct fast-moving spiraling jets of gas into the body 202 of the gas containment structure 108. In this embodiment, the gas flow moves upward into body 202 and impinges on the wall of the body 202. Then, axial flow reverses direction (moving downward) and leaves the body 202 near the axis of the neck 204 of the gas containment structure 108. The plasma 110, located at the axis in the region of reverse flow, creates hot plume of gas that is entrained and mixed with the return flow toward the centrally-located outlet 210. In embodiments, the auxiliary flow serves to stabilize the overall flow pattern reducing extra flow eddies that may appear near the contact of gas jets and the body 202. The direction of the auxiliary flow can be either into or out of the body 202.

Referring generally to FIGS. 1-6, in embodiments, the reverse-flow vortex cell 101 includes seal 224. For example, the seal 224 may include a glass-to-metal seal, which serves to hermetically couple the shaft 206 of the gas inlets 120, outlets 122, and other structural components (e.g., lamp mounting features, swirler, etc.). Depending on body construction, one or more seals can be implemented. For example, in the case the body 202 is formed from sapphire, both ends may be sealed forming a plasma cell (e.g., see FIG. 11). By way of another example, in the case the body is fused silica glass, it may be sealed on one end (e.g., see FIG. 2). The seal 224 may utilize a flange structure to implement the seal between the metal and glass surface. One or more flange assemblies may terminate/seal the glass portion of the gas containment structure 108. In embodiments, one or more flange assemblies may secure inlet and/or outlet pipes or tubes and additional mechanical and electronic components. The use of a flanged plasma cell is described in at least U.S. Pat. No. 9,775,226, issued on Sep. 26, 2017; and U.S. Pat. No. 9,185,788, issued on Nov. 10, 2015, which are each incorporated herein by reference in the entirety.

The gas containment structure 108 is formed from an optically transmissive material (e.g., glass) configured for containing the plasma-forming gas and transmitting optical pump illumination 104 and broadband light 115. For example, the body 202 of the gas containment structure 108 may include a spherical section formed from a material transparent to at least a portion of the pump illumination 104 and the broadband light 115. It is noted that the body 202 is not limited to a spherical shape and may take on any suitable shape including, but not limited to, a spherical shape, an ellipsoidal shape, a cylindrical shape, a 'football' shape, and so on. The transmissive portion of the gas containment structure of the reverse-flow vortex cell 101 may be formed from any number of different optical materials. For example, the transmissive portion of the gas containment structure 108 may be formed from, but is not limited to, sapphire, crystal quartz, $CaF_2$, $MgF_2$, or fused silica. It is noted that the vortex flow of the vortex cell 101 keeps the hot plume of the plasma 110 from the walls of the vortex cell 101, which reduces the thermal heat load on the walls and allows for the use of optical materials sensitive to overheating (e.g., fused silica glass, CaF2, MgF2, crystal quartz, and the like).

Figure 7:
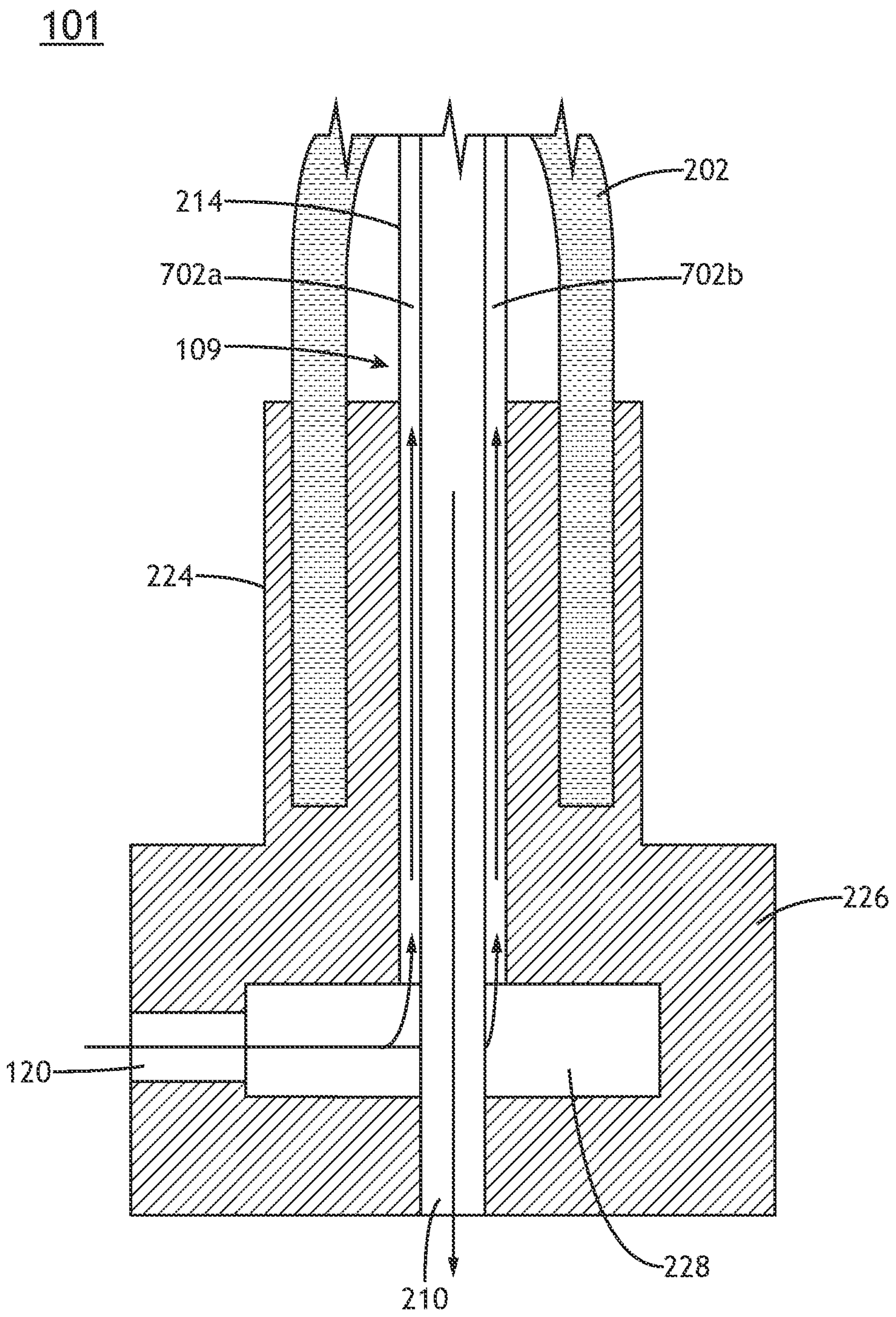
FIG. 7 is a schematic illustration of a distributor of a reverse-flow vortex-generating gas cell with a set of individual inlet channels, in accordance with one or more embodiments of the present disclosure.

FIG. 7 illustrates the reverse-flow vortex cell 101 with a set of individual inlet channels 702*a*, 702*b*, in accordance with one or more additional and/or alternative embodiments. In this embodiment, the reverse-flow vortex cell 101 includes multiple individual inlet channels 702*a*, 702*b* which extend the length of the shaft 214 of the swirler 109. For example, a respective individual channel, such as 702*a* or 702*b*, fluidically couples the one or more plenums 228 of the distributor 226 to a respective nozzle 209 of the swirler 109. It is noted that the use of individual channels 702*a*, 702*b* improves pressure handling within the shaft 214 of the swirler 109.

Figure 8:
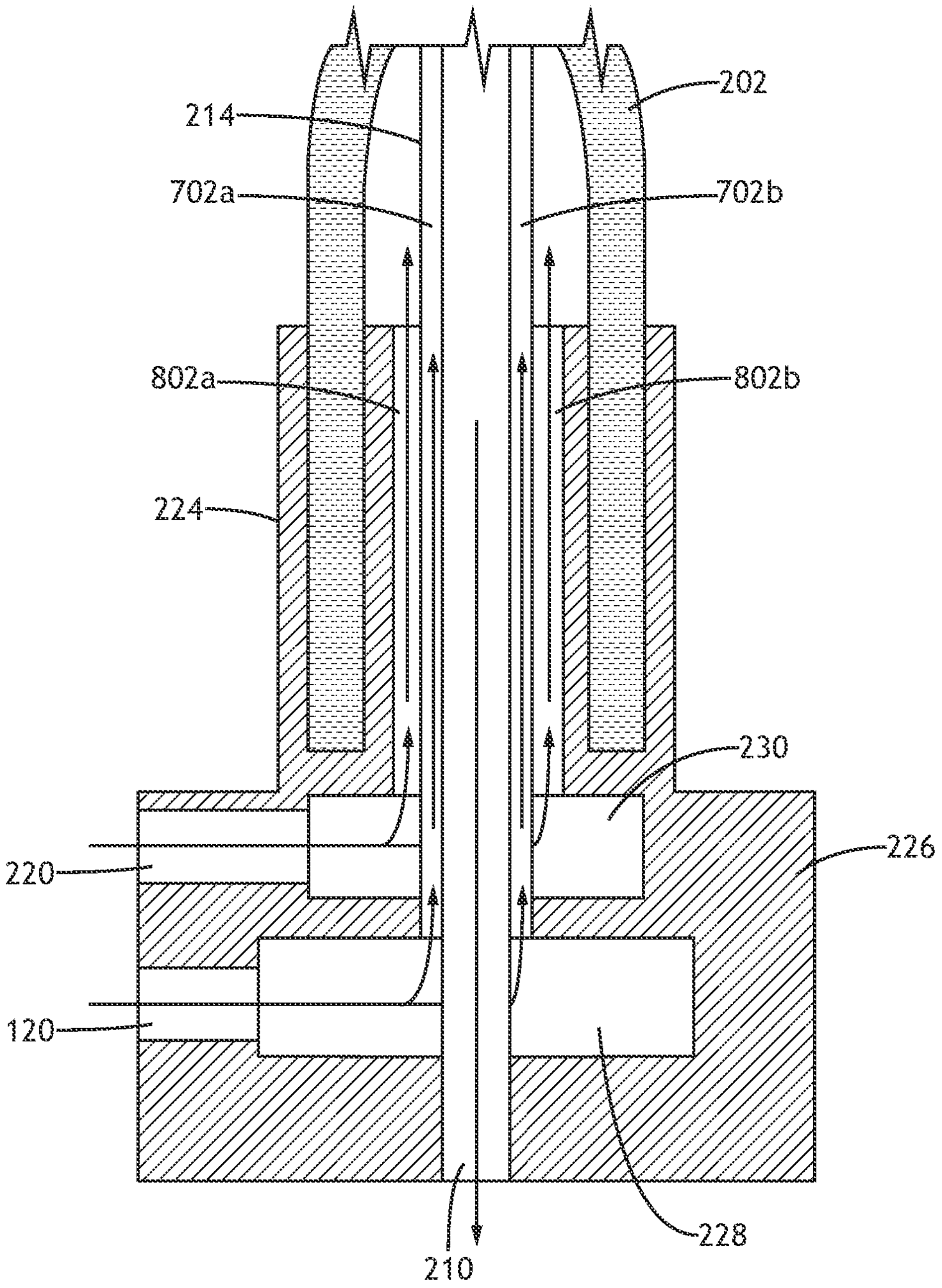
FIG. 8 is a schematic illustration of a distributor of a reverse-flow vortex-generating gas cell with one or more auxiliary inlet channels, in accordance with one or more embodiments of the present disclosure.

FIG. 8 illustrates the reverse-flow vortex cell 101 with one or more auxiliary inlet channels 802*a*, 802*b*, in accordance with one or more embodiments of the present disclosure. In embodiments, the distributor 226 includes one or more auxiliary inlets 220 and auxiliary plenum 230. The auxiliary plenum 230 is configured to distribute gas from the one or more auxiliary inlets to the one or more auxiliary inlet channels 802*a*, 802*b*. In embodiments, the one or more auxiliary inlet channels 802*a*, 802*b* are located in the gap between the swirler shaft 214 and the seal 224. The implementation of the one or more auxiliary inlet channels 802*a*, 802*b* provides the ability to control auxiliary flow rates depending on the lamp operation regime. This control can be automatically implemented by using external plumbing and flow control. It is noted that the reverse-flow vortex cell 101 is not limited to multiple auxiliary inlet channels and it is contemplated that the cell 101 may be equipped with a single auxiliary inlet channel (e.g., annular auxiliary inlet channel). It is noted that the auxiliary gas flow arrangement depicted in FIG. 8 may be reversed to provide auxiliary gas removal from the body 202 of the gas cell 101. In this embodiment, the auxiliary inlet 220 serves as an auxiliary outlet and the directions of gas flow, identified by arrows in FIG. 8, is reversed.

Figure 9:
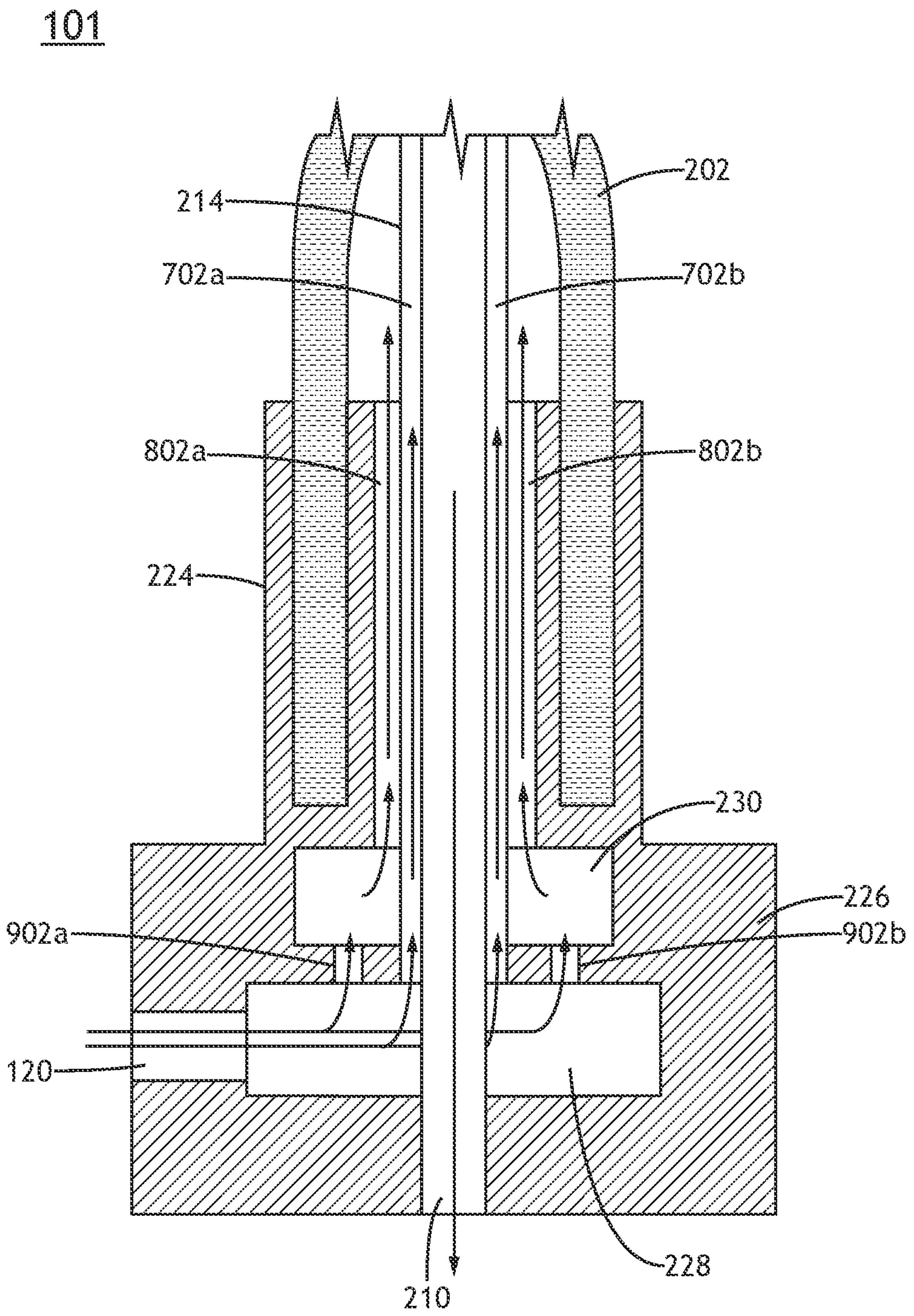
FIG. 9 is a schematic illustration of a distributor of a reverse-flow vortex-generating gas cell with one or more auxiliary supply channels, in accordance with one or more embodiments of the present disclosure.

FIG. 9 illustrates the reverse-flow vortex cell 101 with one or more auxiliary supply channels 902*a*, 902*b*, in accordance with one or more embodiments of the present disclosure. In this embodiment, the one or more auxiliary supply channels 902*a*, 902*b* include one or more passages (e.g., integrated passages) configured to connect the distributor plenum 228 and the auxiliary plenum 230. In this embodiment, the one or more auxiliary supply channels 902*a*, 902*b* are configured to feed auxiliary gas flow from the main distributor plenum 228 to the auxiliary plenum 230. In embodiments, the rate of the auxiliary gas flow is proportional to the main gas flow rate and may be determined by the size of the auxiliary supply channels.

Figure 10:
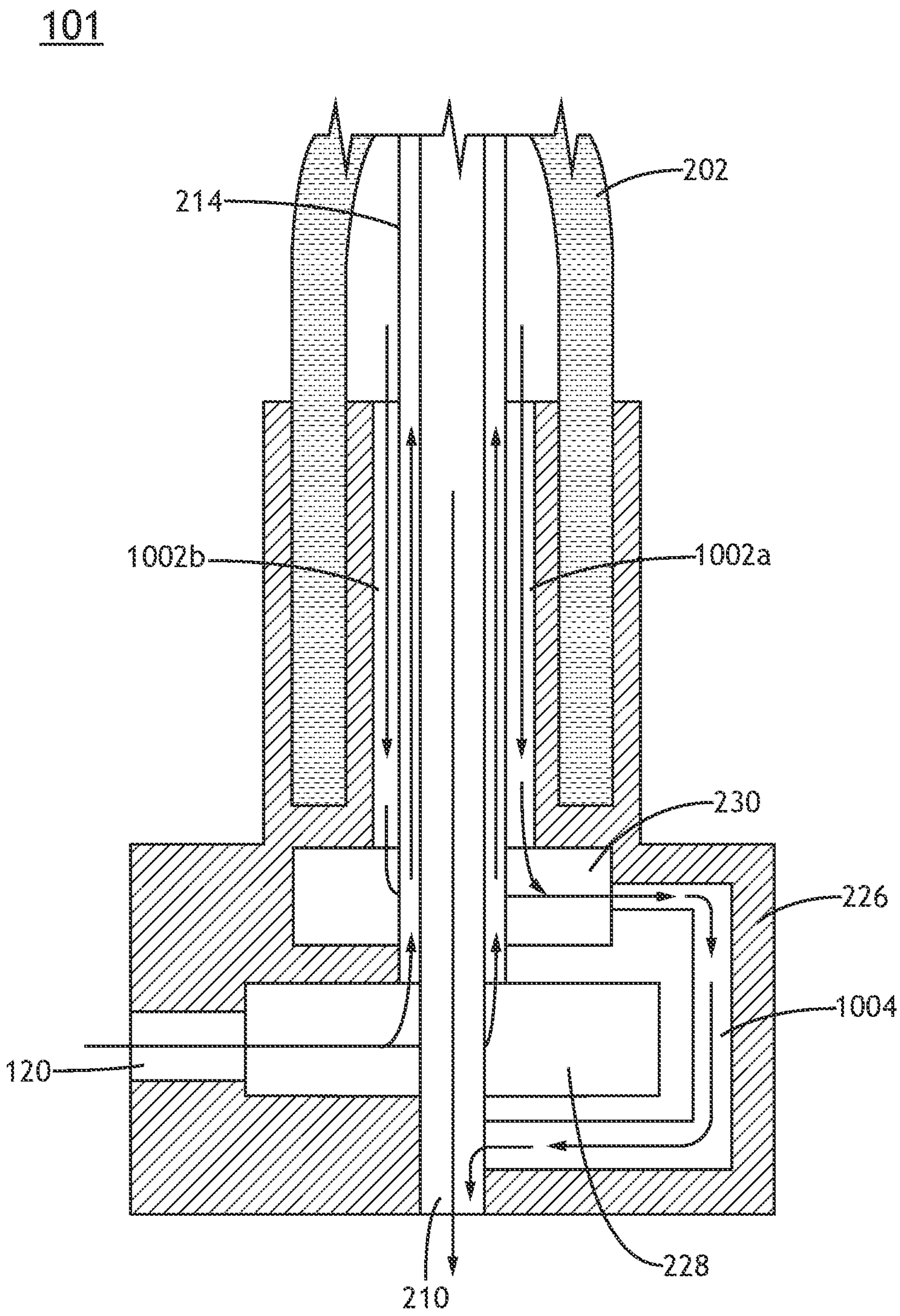
FIG. 10 is a schematic illustration of a distributor of a reverse-flow vortex-generating gas cell with one or more auxiliary exhaust channels, in accordance with one or more embodiments of the present disclosure.

FIG. 10 illustrates the reverse-flow vortex cell 101 with one or more auxiliary exhaust channels 1004, in accordance with one or more embodiments of the present disclosure. In this embodiment, the reverse-flow vortex cell 101 includes one or more auxiliary outlet channels 1002*a*, 1002*b* for removal of gas from the body 202 to the outlet 210. In embodiments, the one or more auxiliary outlet channels 1002*a*, 1002*b* may be the same structural elements used for the one or more auxiliary inlet channels 802*a*, 802*b*, but with the gas flow directed out of the body 202. In embodiments, the one or more auxiliary exhaust channels 1004 are integrated passages configured to direct gas from the one or more auxiliary outlet channels 1002*a*, 1002*b* (e.g., integrated outlet channels) through the distributor 226 to the outlet 210. In embodiments, the one or more auxiliary exhaust channels 1002*a*, 1002*b* cross the annular shaft inlet channel into the central outlet shaft channel. In embodiments, the rate of the auxiliary gas flow is proportional to the main gas flow rate and may be determined by the size of the auxiliary exhaust channel(s).

Figure 11:
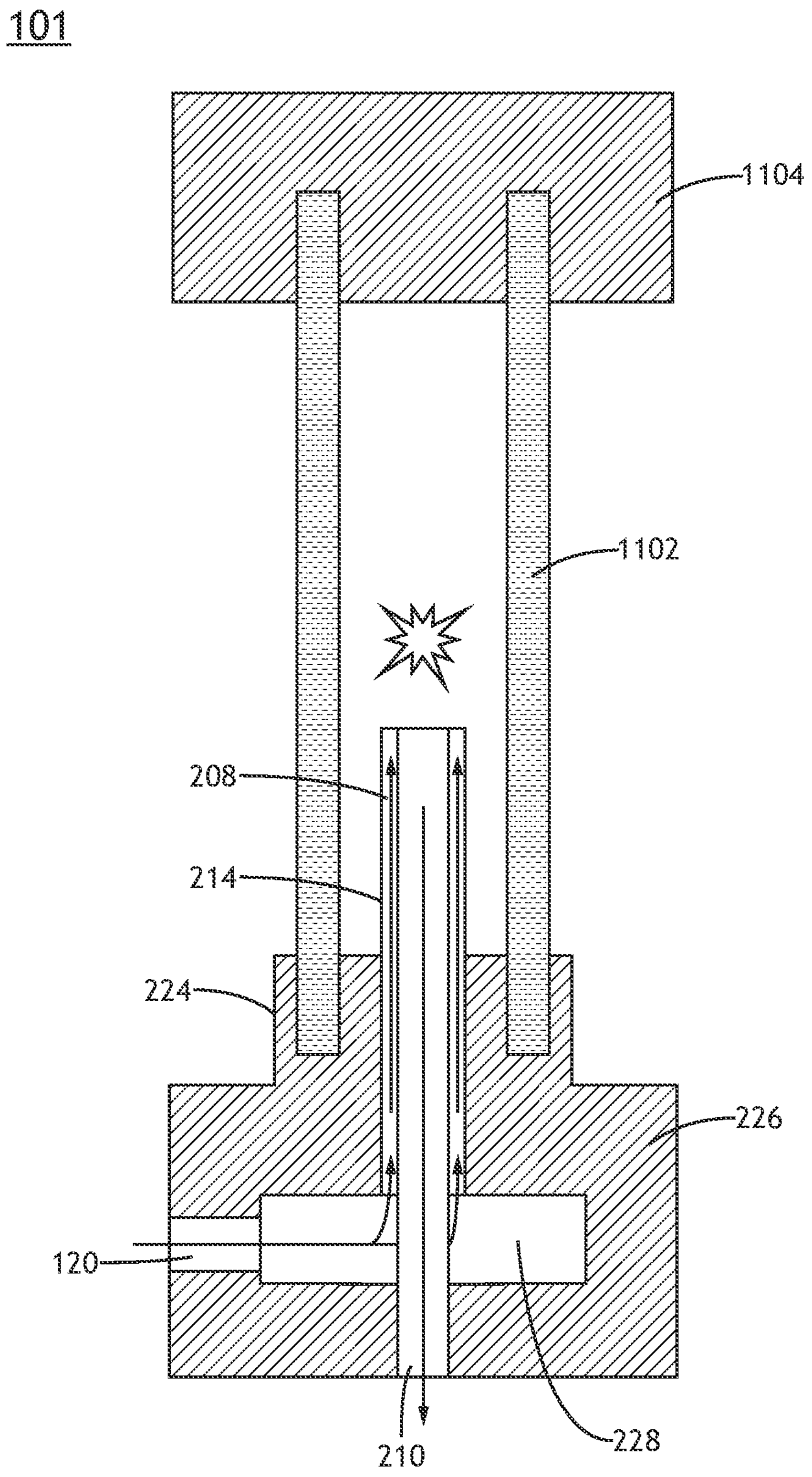
FIG. 11 is a schematic illustration of a distributor of a reverse-flow vortex-generating gas cell having a cylindrical shape, in accordance with one or more embodiments of the present disclosure.

FIG. 11 illustrates the reverse-flow vortex cell 101 including a cylindrical body 1102, in accordance with one or more embodiments of the present disclosure. In embodiments, the cylindrical cell 101 includes a body 1102 shaped as a cylinder with open top and bottom ends. The top and bottom ends of the body 1102 of the cell 101 may be terminated by a flange structure 1104 and the distributor 226. In this embodiment, the flange structure 1104 is configured to terminate and seal the top end of the cylindrical body 1102, while the distributor 226 is configured to terminate and seal the bottom end of the cylindrical body 1102. The body 1102 may be formed from, but is not limited to, fused silica glass or a crystalline material (e.g., crystal quartz, sapphire, $CaF_2$, and the like). Flanged plasma cells are described in at least U.S. Pat. No. 9,775,226, issued on Sep. 26, 2017; and U.S. Pat. No. 9,185,788, issued on Nov. 10, 2015, which are each incorporated previously herein by reference in the entirety.

The generation of a light-sustained plasma is also generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Pat. No. 9,390,902, issued on Jul. 12, 2016, which is incorporated by reference herein in the entirety. In a general sense, the various embodiments of the present disclosure should be interpreted to extend to any plasma-based light source known in the art.

Figure 12:
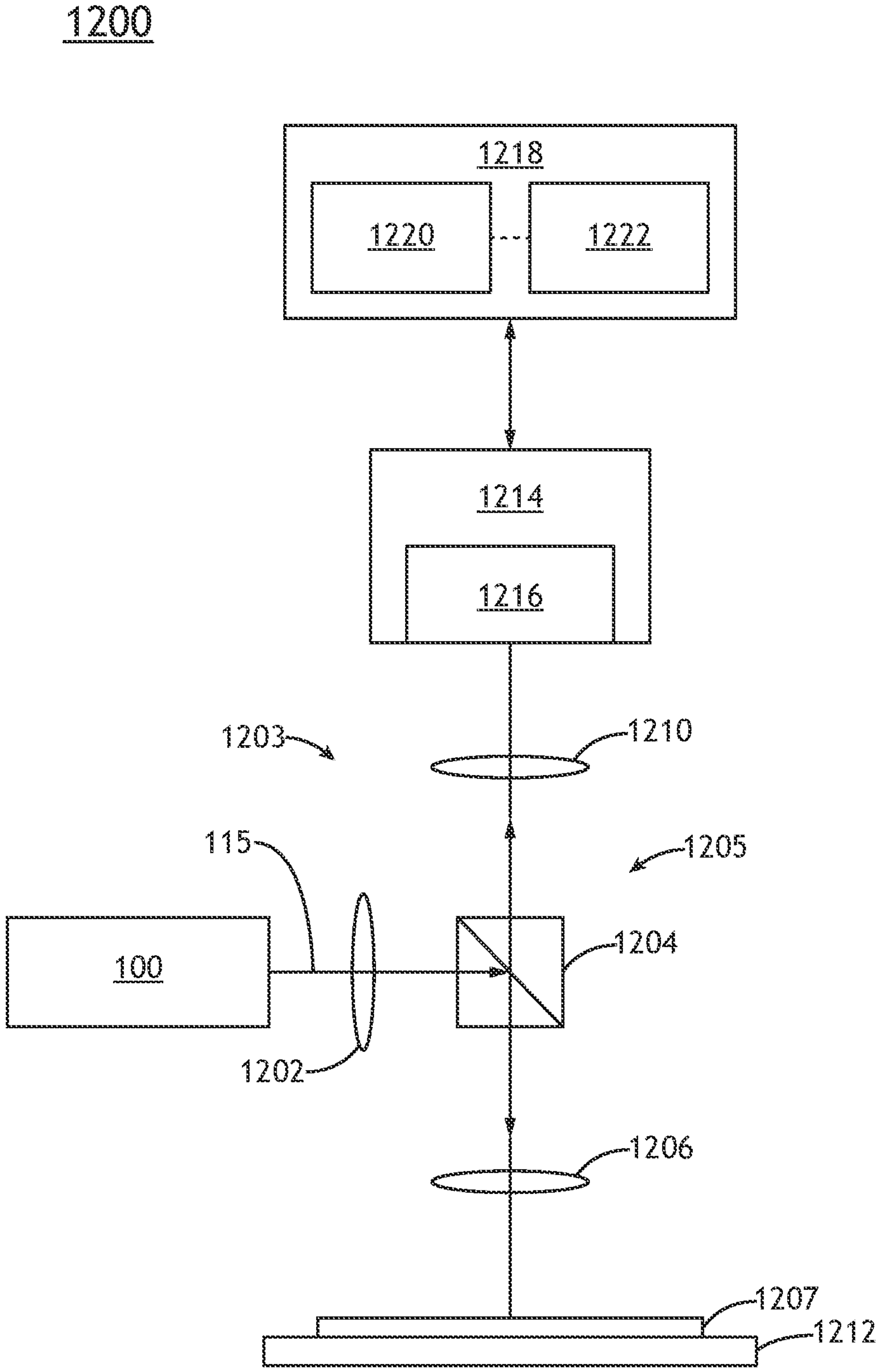
FIG. 12 is a simplified schematic illustration of an optical characterization system implementing the LSP broadband light source illustrated in any of FIGS. 1 through 11, in accordance with one or more embodiments of the present disclosure.

FIG. 12 is a schematic illustration of an optical characterization system 1200 implementing the LSP broadband light source 100 illustrated in any of FIGS. 1 through 11 (or any combination thereof), in accordance with one or more embodiments of the present disclosure.

It is noted herein that system 1200 may comprise any imaging, inspection, metrology, lithography, or other characterization/fabrication system known in the art. In this regard, system 1200 may be configured to perform inspection, optical metrology, lithography, and/or imaging on a sample 1207. Sample 1207 may include any sample known in the art including, but not limited to, a wafer, a reticle/photomask, and the like. It is noted that system 1200 may incorporate one or more of the various embodiments of the LSP broadband light source 100 described throughout the present disclosure.

In embodiments, sample 1207 is disposed on a stage assembly 1212 to facilitate movement of sample 1207. The stage assembly 1212 may include any stage assembly 1212 known in the art including, but not limited to, an X-Y stage, an R-θ stage, and the like. In embodiments, stage assembly 1212 is capable of adjusting the height of sample 1207 during inspection or imaging to maintain focus on the sample 1207.

In embodiments, the set of illumination optics 1203 is configured to direct illumination from the broadband light source 100 to the sample 1207. The set of illumination optics 1203 may include any number and type of optical components known in the art. In embodiments, the set of illumination optics 1203 includes one or more optical elements such as, but not limited to, one or more lenses 1202, one or more beam splitters 1204, and an objective lens 1206. In this regard, set of illumination optics 1203 may be configured to focus illumination from the LSP broadband light source 100 onto the surface of the sample 1207. The one or more optical elements may include any additional optical element or combination of optical elements known in the art including, but not limited to, one or more mirrors, one or more lenses, one or more polarizers, one or more gratings, one or more filters, one or more beam splitters, and the like.

In embodiments, the set of collection optics 1205 is configured to collect light reflected, scattered, diffracted, and/or emitted from sample 1207. In embodiments, the set of collection optics 1205, such as, but not limited to, focusing lens 1210, may direct and/or focus the light from the sample 1207 to a sensor 1216 of a detector assembly 1214. It is noted that sensor 1216 and detector assembly 1214 may include any sensor and detector assembly known in the art. For example, the sensor 1216 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 1216 may include, but is not limited to, a line sensor or an electron-bombarded line sensor.

In embodiments, the detector assembly 1214 is communicatively coupled to a controller 1218 including one or more processors 1220 and memory 1222. For example, the one or more processors 1220 may be communicatively coupled to the memory 1222, wherein the one or more processors 1220 are configured to execute a set of program instructions stored on the memory 1222. In embodiments, the one or more processors 1220 are configured to analyze the output of the detector assembly 1214. In embodiments, the set of program instructions are configured to cause the one or more processors 1220 to analyze one or more characteristics of the sample 1207. In embodiments, the set of program instructions are configured to cause the one or more processors 1220 to modify one or more characteristics of system 1200 in order to maintain focus on the sample 1207 and/or the sensor 1216.

It is noted that the system 1200 may be configured in any optical configuration known in the art including, but not limited to, a dark-field configuration, a bright-field orientation, and the like.

Figure 13:
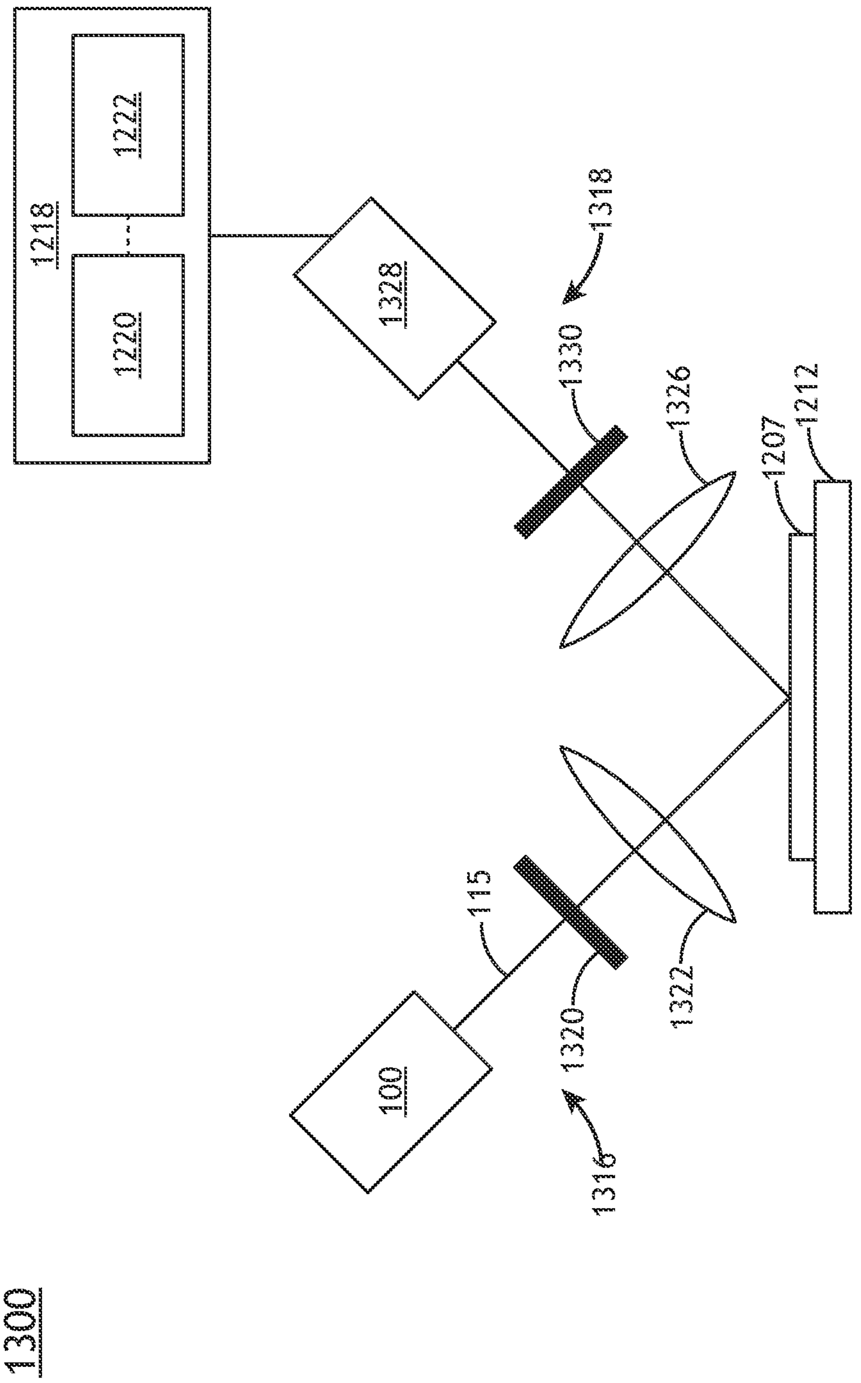
FIG. 13 is a simplified schematic illustration of an optical characterization system implementing the LSP broadband light source illustrated in any of FIGS. 1 through 11, in accordance with one or more embodiments of the present disclosure.

FIG. 13 illustrates a simplified schematic diagram of an optical characterization system 1300 arranged in a reflectometry and/or ellipsometry configuration, in accordance with one or more embodiments of the present disclosure. It is noted that the various embodiments and components described with respect to FIGS. 1 through 12 may be interpreted to extend to the system of FIG. 13. The system 1300 may include any type of metrology system known in the art.

In embodiments, the system 1300 includes the LSP broadband light source 100, a set of illumination optics 1316, a set of collection optics 1318, a detector assembly 1328, and the controller 1218 including the one or more processors 1220 and memory 1222.

In this embodiment, the broadband illumination from the LSP broadband light source 100 is directed to the sample 1207 via the set of illumination optics 1316 and the system 1300 collects illumination from the sample via the set of collection optics 1318. The set of illumination optics 1316 may include one or more beam conditioning components 1320 suitable for modifying and/or conditioning the broadband beam. For example, the one or more beam conditioning components 1320 may include, but are not limited to, one or more polarizers, one or more filters, one or more beam splitters, one or more diffusers, one or more homogenizers, one or more apodizers, one or more beam shapers, or one or more lenses.

In embodiments, the set of illumination optics 1316 may utilize a first focusing element 1322 to focus and/or direct the beam onto the sample 1207 disposed on the sample stage 1212. In embodiments, the set of collection optics 1318 may include a second focusing element 1326 to collect illumination from the sample 1207.

In embodiments, the detector assembly 1328 is configured to capture illumination emanating from the sample 1207 through the set of collection optics 1318. For example, the detector assembly 1328 may receive illumination reflected or scattered (e.g., via specular reflection, diffuse reflection, and the like) from the sample 1207. It is noted that the detector assembly 1328 may include any sensor and detector assembly known in the art. For example, the sensor may include, but is not limited to, CCD detector, a CMOS detector, a TDI detector, a PMT, an APD, and the like.

The set of collection optics 1318 may further include any number of collection beam conditioning elements 1330 to direct and/or modify illumination collected by the second focusing element 1326 including, but not limited to, one or more lenses, one or more filters, one or more polarizers, or one or more phase plates.

The system 1300 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. Pat. No. 7,957,066, entitled "Split Field Inspection System Using Small Catadioptric Objectives," issued on Jun. 7, 2011; U.S. Pat. No. 7,345,825, entitled "Beam Delivery System for Laser Dark-Field Illumination in a Catadioptric Optical System," issued on Mar. 18, 2018; U.S. Pat. No. 5,999,310, entitled "Ultra-broadband UV Microscope Imaging System with Wide Range Zoom Capability," issued on Dec. 7, 1999; U.S. Pat. No. 7,525,649, entitled "Surface Inspection System Using Laser Line Illumination with Two Dimensional Imaging," issued on Apr. 28, 2009; U.S. Pat. No. 9,228,943, entitled "Dynamically Adjustable Semiconductor Metrology System," issued on Jan. 5, 2016; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," issued on Oct. 2, 2001, which are each incorporated herein by reference in their entirety.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A laser-sustained light source comprising:
- a gas containment structure for containing a gas, wherein the gas containment structure comprises a body, a neck, and a shaft;
- a gas seal positioned at a base of the gas containment structure;
- a gas inlet;
- a gas outlet;
- a swirler, the swirler comprising:
  - a plurality of nozzles positioned in or below the neck of the gas containment structure and arranged to generate a vortex gas flow within the gas containment structure; and
  - a swirler shaft including an inlet channel for delivering the gas from the gas inlet to the plurality of nozzles and an outlet channel for delivering the gas from the gas containment structure to the gas outlet;
- a distributor, wherein the distributor includes one or more plenums configured to distribute the gas from the gas inlet into the swirler;
- a laser pump source configured to generate an optical pump to sustain a plasma in a region of the gas containment structure within an inner gas flow within the vortex gas flow; and
- a light collector element configured to collect at least a portion of broadband light emitted from the plasma.

2. The laser-sustained light source of claim 1, wherein the swirler comprises:
- a deflector fluidically coupled to the swirler shaft and extending above the plurality of nozzles and configured to direct gas flow around the swirler.

3. The laser-sustained light source of claim 2, wherein the deflector comprises a convergent deflector.

4. The laser-sustained light source of claim 3, wherein the deflector comprises a conical section.

5. The laser-sustained light source of claim 3, wherein the deflector is configured to reduce radiative heat transfer from the plasma.

6. The laser-sustained light source of claim 2, wherein the deflector comprises a divergent deflector configured to direct gas flow around the plasma.

7. The laser-sustained light source of claim 1, wherein the swirler is deflector-less.

8. The laser-sustained light source of claim 1, wherein the plurality of nozzles is positioned on a top surface of the swirler.

9. The laser-sustained light source of claim 1, wherein the plurality of nozzles is positioned on a side surface of the swirler.

10. The laser-sustained light source of claim 1, wherein the plurality of nozzles is positioned on an outer rim of the swirler.

11. The laser-sustained light source of claim 1, wherein the inlet channel of the swirler comprises an annular channel configured to fluidically couple the one or more plenums of the distributor to the plurality of nozzles of the swirler.

12. The laser-sustained light source of claim 1, wherein the inlet channel of the swirler comprises a plurality of individual channels, wherein a respective individual channel is configured to fluidically couple the one or more plenums of the distributor to a respective nozzle of the plurality of nozzles of the swirler.

13. The laser-sustained light source of claim 1, further comprising:
- one or more auxiliary inlets.

14. The laser-sustained light source of claim 13, wherein the distributor comprises an auxiliary plenum configured to distribute the gas from the one or more auxiliary inlets to one or more auxiliary inlet channels.

15. The laser-sustained light source of claim 13, further comprising:
- one or more auxiliary supply channels.

16. The laser-sustained light source of claim 1, further comprising:
- one or more auxiliary exhaust channels.

17. The laser-sustained light source of claim 1, wherein the plurality of nozzles of the swirler are configured to generate a plurality of gas jets in a spiral pattern.

18. The laser-sustained light source of claim 1, wherein the body of the gas containment structure comprises at least one of a cylindrical body, a spherical body, or an ellipsoidal body.

19. The laser-sustained light source of claim 1, wherein the gas containment structure comprises at least one of a plasma cell, a plasma bulb, or a plasma chamber.

20. The laser-sustained light source of claim 1, wherein the gas contained within the gas containment structure comprises at least one Xe, Ar, Ne, Kr, He $N_2$, $H_2O$, $O_2$, $H_2$, $D_2$, $F_2$, $CF_6$, or a mixture of two or more of Xe, Ar, Ne, Kr, He, $N_2$, $H_2O$, $O_2$, $H_2$, $D_2$, $F_2$, or $CF_6$.

21. The laser-sustained light source of claim 1, wherein the light collector element comprises an elliptical, parabolical, or spherical light collector element.

22. The laser-sustained light source of claim 1, wherein the pump source comprises:
- one or more lasers.

23. The laser-sustained light source of claim 22, wherein the pump source comprises:
- at least one of an infrared laser, a visible laser, or an ultraviolet laser.

24. The laser-sustained light source of claim 1, wherein the light collector element is configured to collect at least one of broadband infrared, visible, UV, VUV, or DUV light from the plasma.

25. The laser-sustained light source of claim 1, further comprising: one or more additional collection optics configured to direct a broadband light output from the plasma to one or more downstream applications.

26. The laser-sustained light source of claim 25, wherein the one or more downstream applications comprises at least one of inspection or metrology.

27. A characterization system comprising:
- a laser-sustained light source comprising:
  - a gas containment structure for containing a gas, wherein the gas containment structure comprises a body, a neck, and a shaft;
  - a gas seal positioned at a base of the gas containment structure;
  - a gas inlet;

a gas outlet;

a swirler, the swirler comprising:

a plurality of nozzles positioned in or below the neck of the gas containment structure and arranged to generate a vortex gas flow within the gas containment structure; and a swirler shaft including an inlet channel for delivering the gas from the gas inlet to the plurality of nozzles and an outlet channel for delivering the gas from the gas containment structure to the gas outlet;

a distributor, wherein the distributor includes one or more plenums configured to distribute the gas from the gas inlet into the swirler;

a laser pump source configured to generate an optical pump to sustain a plasma in a region of the gas containment structure within an inner gas flow within the vortex gas flow; and a light collector element configured to collect at least a portion of broadband light emitted from the plasma;

a set of illumination optics configured to direct broadband light from the laser-sustained light source to one or more samples;

a set of collection optics configured to collect light emanating from the one or more samples; and a detector assembly.

28. The characterization system of claim 27, wherein the swirler comprises:

a deflector fluidically coupled to the swirler shaft and extending above the plurality of nozzles.

29. A plasma lamp comprising:

a gas containment structure for containing a gas, wherein the gas containment structure comprises a body, a neck, and a shaft;

a gas seal positioned at a base of the gas containment structure;

a gas inlet;

a gas outlet;

a swirler, the swirler comprising:

a plurality of nozzles positioned in or below the neck of the gas containment structure and arranged to generate a vortex gas flow within the gas containment structure; and a swirler shaft including an inlet channel for delivering the gas from the gas inlet to the plurality of nozzles and an outlet channel for delivering the gas from the gas containment structure to the gas outlet; and a distributor, wherein the distributor includes one or more plenums configured to distribute the gas from the gas inlet into the swirler.

30. The plasma lamp of claim 29, wherein the swirler comprises:

a deflector fluidically coupled to the swirler shaft and extending above the plurality of nozzles.

* * * * *